United States Patent [19]

Lefevre et al.

[11] Patent Number: 4,882,716

[45] Date of Patent: Nov. 21, 1989

[54] OPTIC FIBER HYDROPHONE AND ANTENNA ASSOCIATING A SERIES OF HYDROPHONES

[75] Inventors: Herve Lefevre, Paris; Dominique Rojas, Arcueil; Marc Turpin, Bure sur Yvette, all of France

[73] Assignee: Thomson-CSF, Paris, France

[21] Appl. No.: 300,933

[22] Filed: Jan. 24, 1989

[30] Foreign Application Priority Data

Jan. 25, 1988 [FR] France ................................. 88 00781

[51] Int. Cl.$^4$ .............................................. H04R 1/02
[52] U.S. Cl. ................................. 367/149; 350/96.29; 250/231 P; 356/345
[58] Field of Search .................. 367/20, 140, 149, 153, 367/154; 350/96.29; 356/345, 351, 241; 370/1, 2; 250/225, 227, 231 P; 73/653, 655, 657

[56] References Cited

U.S. PATENT DOCUMENTS

| | | | |
|---|---|---|---|
| 4,545,253 | 10/1985 | Aricola | 367/140 X |
| 4,751,690 | 6/1988 | Krueger | 367/149 |

FOREIGN PATENT DOCUMENTS 0104932  4/1984  European Pat. Off. .
0129972  1/1985  European Pat. Off. .

OTHER PUBLICATIONS

Chalabi et al., "Partially Coherent Sources in Interferometric Sensors", First International Conf. Optic Fiber, Apr. 1983, pp. 132–135.
Xie et al., "Side-Hole Fiber for Fiber-Optic Pressure Sensing", Optics Letters, vol. 11, #5, Mar. 1986, pp. 333–335.
Optics Letters, vol. 11, No. 5, May 1986, pp. 333–335, Optical Society of America, New York, U.S.; H. M. Xie, et al.
First International Conference on Optical Fibre Sensors, Apr. 26–28, 1983, London, pp. 132–135; S. A. Al-Chalabi, et al.

*Primary Examiner*—Brian S. Steinberger
*Attorney, Agent, or Firm*—Oblon, Spivak, McClelland, Maier & Neustadt

[57] ABSTRACT

An optic fiber hydrophone comprises a wide spectrum optical source, a super-luminescent diode for example, associated with an optic fiber assembly comprising chiefly a side-hole optic fiber, subjected to the field of pressure, forming a sensor, transmitting the optic radiation in the slow and fast modes respectively, and a second fiber, not subjected to the field of pressure, the neutral axes of which are oriented with respect to the neutral axis of the first fiber so that the wave transmitted in slow mode in one fiber is transmitted in fast mode in the other fiber, it being possible to connect these two fibers by a polarization maintaining fiber in the event that the sensor is offset with respect to the source, a polarizing fiber enabling the creation of the interferences, and a radiation detector at the output of the fiber assembly.

5 Claims, 3 Drawing Sheets

OPTIC FIBER HYDROPHONE AND ANTENNA ASSOCIATING A SERIES OF HYDROPHONES

BACKGROUND OF THE INVENTION

1. Field of the Invention

The invention relates to an optic fiber hydrophone and applies to the making of multiple-sensor, towed antennas associating a series of hydrophones.

The elasto-optical effect in silica fibers has been recognized as an attractive process for making efficient hydrophones: an isotropic pressure applied to a monomode fiber modifies its length as well as its refractive indices, causing a variation in the phase of the wave which is propagated therein. This phase shift is measured in an interferometrical assembly, generally a MACH-ZEHNDER infererometer which compares the phase shift created in a reference coil, not subjected to the field of pressure, with that created in a detection coil sensitive to this field.

Although the effect to be measured is intrinsically weak, high levels of sensitivity are possible because of low losses in the silica fibers which, through the use of great fiber lengths, enable the cumulation of the elementary phase shifts.

2. Description of the Prior Art

This approach, which uses conventional monomode fibers, comes up against the problem of stray thermal dependence. For, the refractive index of silica varies by $10^{-5}$ per degree Celsius and produces phase shifts during temperature variations. These phase shifts are far greater than the phase shifts created by the pressure variations.

To resolve this problem it has been proposed to use a side-hole fiber (herein also called "FASE"), which improves the pressure/temperature efficiency: instead of a solid cylindrical structure for a standard optic fiber, this fiber has two holes, one on each side of the core which guides the light. This structure can be used, firstly, to create a high level of residual birefringence, in the absence of external stress, obtained during fiber drawing and, secondly, to amplify, anisotropically, the effect of an external stress on the core of the fiber, with a homogeneous pressure applied to a fiber of this type being preferably transmitted along the axis perpendicular to the axes of the holes.

The phase shift in a side-hole structure of this type is measured by comparing the two waves being propagated in the same fiber along the two perpendicular axes. This limits to the problems of thermal dependence: the input-separating function is fulfilled by a coupling at 45°, the neutral axes of the side-hole fiber, and the output separating/combining function is fulfilled by an output polarizer/analyzer which is also at 45° to the neutral axes of the fiber.

The use of an interferometer using a fiber of this type removes the problem of the thermal balance of the two arms of the interferometer when they are physically distinct, since the phase shifting due to a temperature variation is the same along both axes.

The interferometer meter has a sinusoidal response as a function of the phase shift between the two arms. For the extreme ends of the sinusoidal curve, there is thus a problem of sensitivity which is conventionally resolved by superimposing a phase modulation on the phase shift created by the sound wave. To make optic fiber hydrophones wherein the measurement is done at a certain distance from the pressure sensor, the need for this modulation then leads:

either to the use of great lengths of connecting fibers at input and at output and also to a great length of electrical cable to supply the modulator close to the sensor;

or to remove the detection coil of the sensor further away from the source and the detector, but then the connecting fibers are an integral part of the interferometer and can produce unwanted phase shifts.

To resolve this problem it has been proposed to use interferometry with white light, namely:

to use a wide spectrum source, hence a source which has no temporal coherence, associated with a first interferometer which has two non-balanced arms, such that the working difference between the two arms is greater than the length of coherence of the source;

then, after passage through a connecting fiber, to use a second interferometer, with the same length of offset as the first one, in order to put the wave trains in coincidence and produce the interferences.

This method enables the creation of interferences as a function of the difference in phase shifts, which are unaffected by the phase shift introduced by the connecting fiber. Furthermore, the insertion of a modulator in one of the two interferometers gives the advantage of sensitivity in the region of the extreme values, for the above-described processing operation.

SUMMARY OF THE INVENTION

An object of the invention is an optic fiber hydrophone which makes it possible, simultaneously, to resolve the problem of sensitivity, that of thermal dependence and that of remote measuring of the phase shift, using interferometry but with a structure which is very easy to adjust, the measurements being dependent solely on the phase shift to be measured which is characteristic of the pressure waves to be detected.

The approach proposed is particularly suited to making multiple-sensor, towed antennas wherein, with a single multiplexing reference, it is possible to measure the phase shifts coming from a great number of sensors distributed over a certain length, without any appreciable loss caused by this multiplexing.

According to the invention, an optic fiber hydrophone comprises:

a wide spectrum source, for example of the linearly polarized, super-luminescent diode type;

a first side-hole optic fiber, called a compensation fiber, not subjected to the field of pressure to be detected, followed by a first polarizer with an axis at 45° to the neutral axes of the fiber which are themselves at 45° to the polarization of the source, forming an interferometer;

a passive sensor, subjected to the field of pressure, comprising a second side-hole optic fiber, having neutral axes reversed with respect to those of the compensation fiber, coupled to the first polarizer and followed by a second polarizer at 45° to the neutral axes of the fiber, forming a second interferometer at the output of which the working differences between the two polarizations, which are not due to the field of pressure, are compensated for;

a detector (D)

and a circuit for the processing of the radiation detected by the detector.

Another object of the invention is a hydrophone antenna associating a series of optic fiber hydrophones, said antenna comprising:

a wide spectrum source, for example of the pulse-modulated, super-luminescent type;

a first side-hole optic fiber, followed by a first polarizer at 45° to the neutral axes of the fiber, forming a compensator;

an optic fiber on which N shunting couplers are distributed;

and N passive sensors, subjected to the field of pressure, connected to the N shunting couplers, each comprising an side-hole optic fiber, with neutral axes that are reversed with respect to those of the fiber of the compensator, followed by a polarizer at 45° to the neutral axes of the fiber and by an output monomode fiber;

an collecting multimode fiber wherein the radiation coming from the sensors is coupled by splices formed between the output monomode fibers of the sensors and the collecting multimode fiber;

a detector D;

and a circuit for the processing of the radiation detected by the detector, said circuit multiplexing and demodulating the signals resulting from passage through the different distributed sensors.

BRIEF DESCRIPTION OF THE DRAWINGS

The invention will be better understood and its other characteristics will emerge from the following description, made with reference to the appended drawings, wherein.

DESCRIPTION OF THE PREFERRED EMBODIMENT

The optic fiber hydrophone according to the invention uses a side-hole fiber coil, as described above. This type of fiber is known in the prior art, for example, from the article by H. M. XIE et al , "Side hole Fiber for Optic Fiber Pressure Sensing", OPTICS LETTERS, Vol. 11, No. 5, May 1986.

Figure 1:
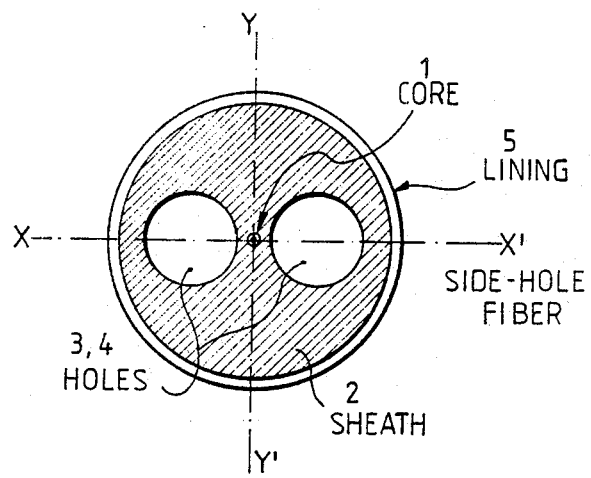
FIG. 1 is a sectional drawing of a side-hole fiber, used in the hydrophone according to the invention.

In FIG. 1, which shows the section of a side-hole optic fiber or "FASE", the core 1 is surrounded by a sheath 2 wherein two side holes or hollows, 3 and 4 have been formed during the fiber drawing operation, at a small distance from the core and from the reference surface of the fiber, which is itself covered with a coating 5. These side holes extend throughout the length of the fiber, parallel to its axis: their centers and the center of the fiber are aligned (X X' in FIG. 1). Consequently, a homogeneous pressure applied to a fiber of this type is preferably transmitted along the axis YY' which is perpendicular to the side holes. Moreover, this structure tends to confine the force lines in the central wall, which has a small section as compared with the section of the fiber, and hence increases the compression at the core (the part in which the optic radiation is propagated) as compared with the external pressure.

As indicated above, this anisotropic stress creates birefringence through elasto-optical effect, i.e., it creates a different, additional phase shift between the waves that get propagated respectively in a direction that is perpendicular or parallel to the axis YY' along which the stress is applied.

The phase shift measured is that which results from the two waves which get propagated in the same fiber along the mutually perpendicular axes at different speeds: the difference between these speeds varies with the external pressure.

As indicated above, this structure enables, firstly, the creation of a high level of residual birefringence, even when there is no external stress and, secondly, the amplification, anisotropically, of the effect of an external stress on the core of the fiber. The phase shift measured by the interferometry techniques, using both neutral axes of the fiber as two arms of an interferometer, may lead to levels of sensitivity, to pressure, of the order of $20 \times 10^{-5}$ rad/Pa.m and a thermal sensitivity of the order of 0.3 rad/°C.m. These values are to be compared with the values obtained for a conventional fiber, namely sensitivity to pressure of $4 \times 10^{-5}$ rad/pa.m and sensitivity to temperature of 100 rad/°C.m. This enables the ratio of the thermal and acoustic sensitivity levels to be reduced by about three magnitudes. Nonetheless, the fact remains that the effects due to pressure must be isolated from the effects due to temperature, whereas the former are smaller than the latter by a few magnitudes.

The elementary sensor using a side-hole fiber of this type may be a localized sensor, even where a long fiber is used to measure very low pressures: for, a FASE fiber coil can be packaged in a very small volume.

Figure 2A:
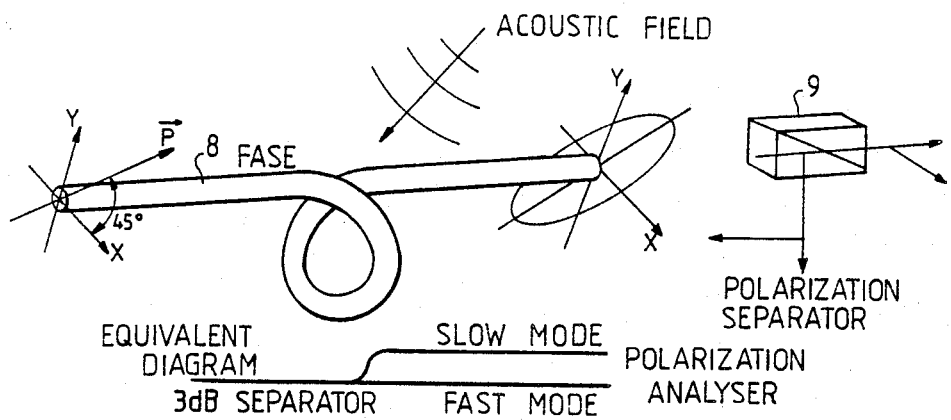
FIGS. 2a, 2b and 2c are explanatory diagrams showing the use of a side-hole fiber as an acoustic field sensor.
Figure 2B:
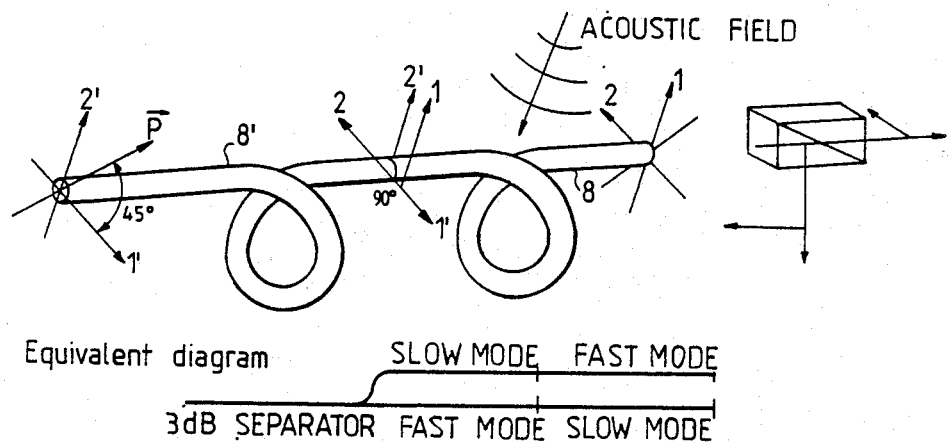
Figure 2C:
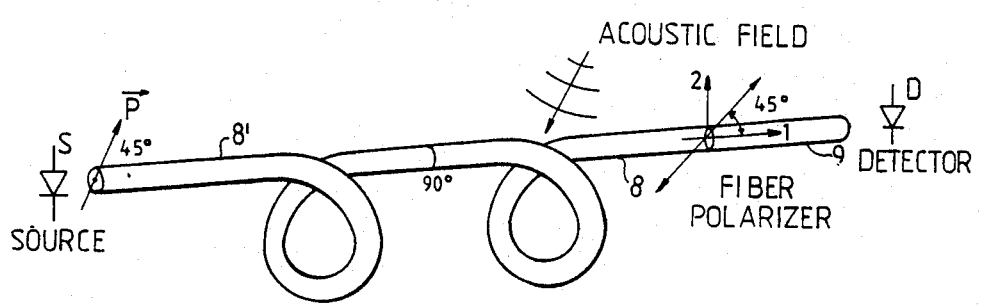

FIGS. 2a, 2b and 2c explain the working of the elementary sensor:

A source enables the coupling, with the side-hole fiber shown in FIG. 2a, of a wave with polarization P, oriented at 45° to the neutral axes X and Y of the optic fiber 8, to balance the two waves that are propagated along these two neutral axes, which are fast and slow respectively. The difference in index causes a phase shift that grows with distance. This results in an ellipticity which is variable with the local value of the phase shift, changing periodically from a circular polarization (quadrature modes) to a rectilinear polarization (phase and phase opposition modes). At the output of the fiber, the state of polarization depends on the length of this fiber in ratio to the beat length. When there is no stress, this polarization state can be analyzed. When there is stress, there is a modification of the birefringence (difference in index/n between the two modes) hence of the beat length which depends on it, and, consequently, a modification of the state of polarization at the output of the fiber. A polarization separator 9, a Wollaston prism for example, is used to separate the two components, which have been propagated at different speeds, so as to make them interfere. A modulation of intensity, resulting from the phase shift between the two channels, is thus observed at output. The equivalent diagram of this elementary structure is a 3bB separator, equivalent to the couplng at 45° to the neutral axes, then one and the same path taken by the two components at two different speeds, and a polarization analyzer.

As indicted above, the temperature dependence in an interferometer using only one fiber is quite smaller than that which exists in an interferometer using two different fibers. However, this dependence as a function of temperature still exists. It may be cancelled by using two lengths of side-hole fibers connected together in such a way that the slow and fast axes of one are opposite to the slow and fast axes of the other. For this, it suffices to use a side-hole fiber, to section it in its middle and to give one end a 90° urn before connecting it to the other. A structure of this type is shown in FIG. 2b, and enables the elimination of the temperature dependence. The neutral axes 1 and 2 of the second piece of fiber 8 are respectively colinear with the neutral axes 2' and 1' of the first piece of fiber 8'. In this structure, the first piece of fiber 8' should undergo solely a phase shift due to the temperature, this first part of the fiber being outside the acoustic pressure field, and the second part of the fiber 8 undergoes both a phase shift due to temperature and a phase shift due to the acoustic pressure, with the phase shift due to temperature compensating for the phase shift obtained in the first part. The equivalent diagram has, after the 3dB separator, a first path corresponding to the neutral axes 1' and 2 with a high speed part and a low speed part, and a second path corresponding to the polarization along the neutral axes 2' and 1, with a low speed part followed by a high speed part. Thus, the phase shifts due to the temperature are the same for both waves.

FIG. 2c illustrates the elementary structure for an "all fiber" sensor: a source S couples a light polarized along $\vec{P}$ in the fiber which is in two pieces; a fiber polarizer at the output, with an axis oriented at 45° to the neutral axes of the output fiber, creates interferences between the two components, along the axis of the polarizer, of the two waves transmitted at different speeds in the fiber. A detector D is used to measure the intensity resulting from the interferences.

According to the invention, the radiation transmitted in the fiber is thus polarized, and the principle of polarimetry applied has a fundamental difference with respect to the one used in standard devices (MACH-ZEHNDER or MICHELSON interferometer): the inter-fringe distance detected at the output of the interferometer (corresponding to a relative phase shift of $2\pi$ for two consecutive fringes) is no longer related to the wavelength but to the beat length, namely to the length at the end of which the phase shift due to the birefringence is equal to $2\pi$. This beat length $L_B$ is equal to the wavelength $\lambda$ divided by the intrinsic birefringence $n_o$, namely, the birefringence when there is no external stress. This birefringence $n_o$ is about $10^{-4}$. The beat length is therefore of the order of $10^{+4}\lambda$, i.e. 10 mm. approximately, for a wavelength $\lambda = 1$ μm.

Since a fiber length of 100 meters is to be adjusted to a fraction of the inter-fringe distance, notably for a multiple-sensor hydrophone, for an entire series of sensors for which identical sensitivity is sought, the adjustment is much easier when the inter-fringe distance is 10 mm. than when it is equal to 1 um, namely equal to a wavelength in standard interferometrical devices. This structure, therefore, is particularly well adapted to the measurement of pressure and enables the making of a simple, highly sensitive optic fiber sensor.

Figure 3:
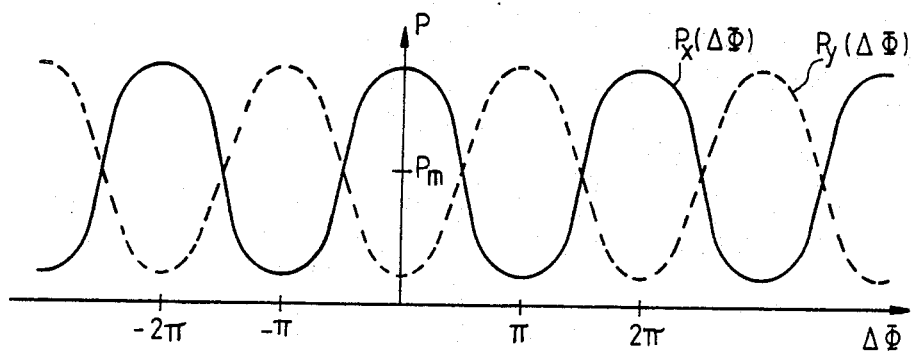
FIG. 3 shows the signals coming from the detector of the hydrophone, as a function of the phase shift.

FIG. 3 shows the variation in the output power P, in an interferometer, measured after an output polarizer, as a function of the phase shift. This variation is sinusoidal and there is a problem in measuring the vicinity of the maximum values. The standard way to resolve this type of problem is to do a phase modulation which is superimposed on the phase modulation, to be measured, resulting from the acoustic pressure field. In the case, for example, of a sinusoidal superimposed modulation $Q_0 \sin 2\pi ft$, the resulting interference signal is modulated by components at the different harmonics of the modulation frequency f. The amplitude of the odd harmonics is proportionate to $\sin\Phi$ and that of the even harmonics to $\cos\Phi$. These amplitudes ae measured with demodulators at frequencies f and $2f$ for example.

The problem that then arises in the use of a sensor of this type, as a hydrophone which is remote coupled to a measuring means, is the following: for the remote reading of the variations in density resulting from interferometry in an optic fiber, it is necessary either to use great lengths of connecting fibers at input and output of the sensor, and also a great length of electrical cable to supply the modulator, or to move the sensor to a distance from the modulator. But then the connecting fibers are an integral part of the interferometer and may create unwanted phase shifts. To resolve this problem, it is worthwhile to use the known concept of "white light" interferometry (wide spectrum source) and to apply it to the guided waves, see, for example, the example, the article by S. A. Al Chalabi et al in Proceedings, 1st International Conference on Optical Fiber sources, IEEE, April 1983, Page 132, "Partial Coherent Sources in Interferometric Sensors"). For this, a wide spectrum optical source is used: super-luminescent diode type for example. The hydrophone according to the invention also uses this principle of "white" light interferometry.

For, in an interferometer with two arms, the contrast between the interferences disappears when the difference in the optical path between the two arms is greater than the length pf coherence $L_C$ of the optical source, which is itself inversely proportional to the spectrum width $\Delta\lambda$ For an SLD type of source, a length of coherence is equal to about 20 wavelengths on an average ($L_C = \Delta\lambda/\lambda^2$).

If a second interferometer, non-balanced in the same way as the first one, is used, contrasting fringes can be recovered: for, assuming that the source emits wave trains with a length $L_C$, if there is no overlapping of the wave trains at the output of the interferometer, the fringes lose their contrast. If the two wave trains in series, coming from a gate of the interferometer, go into a second interferometer which is non-balanced in the same way as the first one, there are at the output of the assembly, four wave trains, one which has taken two short paths, two intermediate ones which overlap and which have respectively taken short-long paths and long-short paths, and a last one which has taken both the long paths.

The two overlapping wave trains create contrasting interferences depending on the difference between the phase shifts of each of the two interferometers: the optical path between these two interferometers does not come into play.

This offsetting technique can be used for remote application of the phase modulation method designed to avoid losses of sensitivity when the system shifts towards an extreme value of the interferometrical response.

The phase modulator may be a birefringence modulator made, for example, in integrated optics on lithium niobate, by differential phase modulation between the TE and TM modes, by electrical control. According to the invention, therefore, the system comprises a source, a modulated interferometer, an entirely passive detection interferometer, which is removed to a distance from the source and the detector and can therefore be submerged far from the processing center, and a detector or, in an equivalent way, a source and then a delocated and entirely passive detection interferometer followed by the modulated interferometer.

Figure 4:
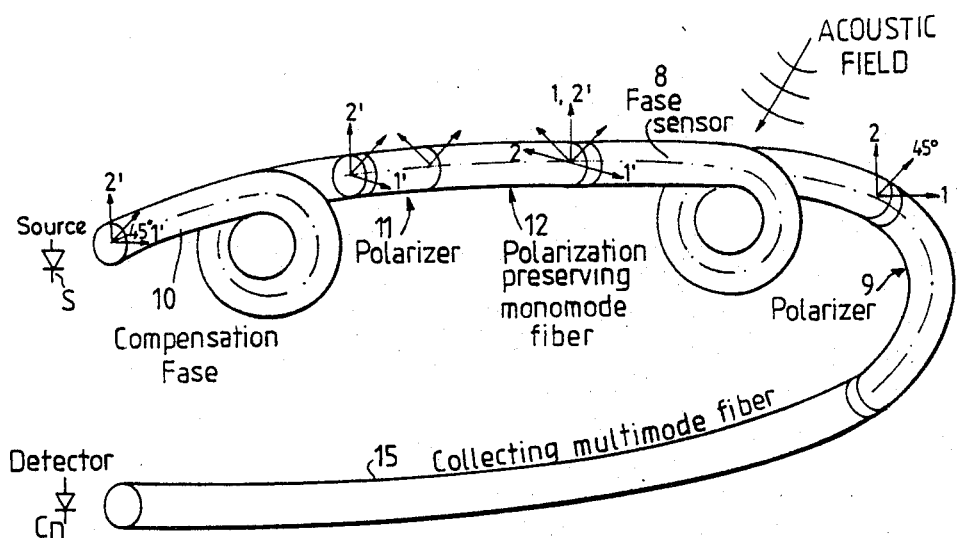
FIG. 4 is a drawing of an elementary hydrophonic sensor according to the invention.

In practice, the elementary hydrophone with a side hole fiber, according to the invention, comprises, in an embodiment shown in FIG. 4:

a wide spectrum source (super-luminescent diode "SLD" for example) which is linearly polarized either by manufacture or by means of a polarizer at the output of this source;

a side-hole fiber 10, called a compensation fiber, not subjected to the field of pressure, with neutral axes 1' and 2' at 45° to the polarization of the source, forming the interferometer designed to compensate for the working difference induced by the measuring interferometer.

a fiber polarizer 11, enabling the creation of the interferences between modes at the output of this first FASE along the polarization axis oriented at 45° to the neutral axes 1' and 2';

a polarization preserving monomode fiber 12, enabling the offset of the element sensitive to the field of pressure, with axes at 45° to the neutral axes 1' and 2';

the end of this polarization preserving monomode fiber 12 is coupled to the end of a second side-pole fiber "FASE" 8 with neutral axes 1 and 2 at 90° to the neutral axes 1' and 2' of the former fiber sensitive to the field of pressure;

the output of the side-hole fiber is again coupled to a fiber polarizer 9, at 90° to the neutral axes 1 and 2 of the side-hole fiber;

the output face of the polarizing fiber is bonded to the input face of an collection multimode fiber 15 coupled to the output detector D.

As indicated above, this system is complemented by a modulated interferometer, placed either at input, between the source and the input polarizer, or at output, after the output polarizer. This modulated interferometer may be a polarimeter using, as a modulator, a straight, integrated optics circuit wih a maximized modulation difference between the TE and TM modes.

The advantage of using polarimeters rather than standard interferometers (MICHELSON or MACH-ZENDER) is the greater ease obtained in adjusting the shift between the two arms. For, when a super-luminescent diode type of wide spectrum source is used, the coherence length $L_C$ is typically 20 to 30 wavelengths, i.e. about 20 micrometers. These lengths are impossible to control for lengths of about one meter.

As indicated above, with a polarimeter, the lengths must be adjusted to about 20 clearance lengths $L_B$ ($L_B$ being the length at the end of which the slow and fast modes are shifted by one wavelength). The clearance length is of the order of 10 to 20 millimeters. The sensitivity needed for a hydrophone requires 50 to 100 meters of side-hole fiber, mamely, 2500 to 10000 clearance lengths. The residual birefringence typically varies by $10^{-3}/°C.$, leading to thermal dependence of 2.5 to $10\lambda/°C$. These 2500 to 10000 clearance lengths mean that the shift of the polarimeter is 2500 to 10000 wavelengths, which is far greater than the 20 wavelengths of coherence of the source. If there is placed, in series with the side-hole fiber, an ordinary polarization preserving fiber with its slow and fast axes reversed with respect to the axes of the side-hole fiber, the shift can be reduced to a length which is slightly greater than the coherence length, i.e. by $100\lambda$ for example, and the thermal dependence then will no longer be anything but $0.1\lambda/°C$.

Since polarization preserving fiber has a negligible sensitivity under pressure, it compensates for the thermal dependence while, at the same time, preserving the dependence in terms of pressure It has been indicated above that it is also sought to be able to distribute, over a certain wavelength, a great number of sensors which may be coupled: it is, therefore, quite desirable to be able to read the information coming from these different sensors by means of a single reading device by multiplexing. To do this, it is known that remote reading techniques can be associated with a time division multiplexing system. For this, the radiation coming from a wide spectrum source is modulated in pulses of a duration $\iota$ and then transmitted to different interferometers having the same shift, $\Delta L$. The pulses which are sent into the different interferometers return, separated in time, to the detector, after having again gone into the same modulated interferometer. The problem raised by this type of technique is that it uses monomode fibers, and the monomode couplers used for the addressing are necessarily symmetrical. This means that if it is desired to recombine all the power that has gone through the interferometer in a single return fiber, the light coming from the interferometers located upstream is lost.

To avoid this problem, it is advantageous to be able to use a multimode return collection fiber. In this case, it is possible to achieve an efficient coupling of the light coming from the output monomode fiber of an interferometer with the collection multimode fiber without, thereby, in any way losing the light already coupled upstream to this very same multimode fiber. But, in this case, the modulated interferometer cannot be coupled efficiently to the output multimode fiber. It is therefore necessary to place the monomode modulated interferometer between the source and the elementary sensors.

Figure 5:
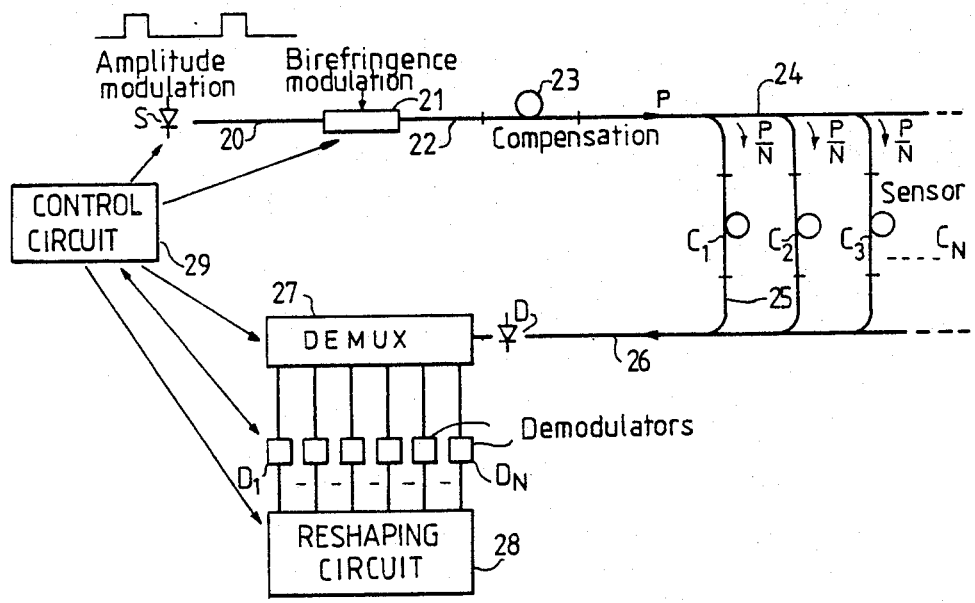
FIG. 5 is a drawing of a multiple sensor hydrophonic antenna for remote measuring, according to the invention.

The block diagram of a multiple-sensor hydrophonic antenna according to the invention is shown in FIG. 5.

The wide spectrum source S is pulse modulated and coupled to a first monomode fiber 20. This fiber is followed by a monomode modulated interferometer 21 which is extended by a second monomode fiber 22. A compensation fiber, associated with a polarizer 23, is placed after this, and transmits an optical power P to a monomode separation fiber 24 on which N coupling points are distributed, depending on the number N of measuring points desired. Each connecter is then connected to an elementary sensor $C_1, C_2, \ldots C_N$, namely to a coil of side-hole fiber followed by a fiber polarizer. These elementary sensors are each connected to a monomode multiple-connector connecting fiber 25, leading to a multimode collection fiber 26 which is itself connected to the output detector B. The electrical signal given by the detector is then transmitted to a demultiplexer 27, the outputs of which are connected to demodulators $D_1 \ldots D_N$, themselves connected to a reshaping circuit 28. A control circuit 29 gives the controls for the amplitude modulation of the source, for the birefringence modulator and for the output, demultiplexer, demodulator and reshaping circuits. In the standard devices, the multiplexing of a large number of sensors generally causes very fast deterioration in the signal-to-noise ratio. The temporal addressing done here has the maximum efficiency because, for a given optical power P and a number of sensors N, it is theoretically possible to have optical power P/N available for each sensor. Since the number of these sensors is limited by the photonic noise, the signal-to-noise ratio theoretically decreases only as a function of $\sqrt{N}$.

This principle of collecting the intensities modulated by the different sensors of a grouping enables the use of a multimode fiber and, consequently, the reducing of the coupling losses to the minimum.

To each light pulse from the super-luminescent diode (SLD), there corresponds a sequence of returning pulses, staggered in time along the different paths associated with the different locations of the sensors. The different pulses are sequentially shunted to the appropriate phase demodulator.

On the assumption of a mean return optical power of 4 µW per sensor, the white noise in phase shift is $10^{-6}$ rad/Hz and should correspond to $1.5 \; 10^{-4} Pa/\sqrt{Hz}$ to keep to the signal-to-noise ratio of 0 dB at 2.5 kHz.

The sensitivity of the FASE should therefore be 70 µrad/Pa, namely 35 m of optimized FASE. Since the optical power that can be used in a DSL is in the range of mW, 250 sensors can be multiplexed on one and the same optical transmission medium. The different bypass couplers, splices, polarizers, connectors etc, to be inserted will, in fact, limit the number of sensors grouped together on one and the same medium, probably to about 20 only per rising fiber. Depending on the applications considered, i.e. depending on the number of sensors to be multiplexed, the system thus has a number of parallel systems, each multiplexing some tens of sensors.

The main advantages of this type of optical linear antenna are therefore:

the use of "all fiber" sensors, hence fibers with homogeneous density and low mass;

simplicity in the making of the sensor and potentially low costs for large batches;

the use of a fiber which is intrinsic optimized to detect stresses rather than deformations, resulting in lower sensitivity to temperature;

the use of an interference method related to the clearance length and not to the wavelength, making it easier to minimize the dispersal of sensitivity;

the use of a single multiplexing response for a grouping of sensors, and the possibility of not supplying the sensors with electrical power;

the compatability of the structure with the possibilities of remote reading and multiplexing sought for the making of towed antennas with large numbers of sensors;

the possibility of enhancing the sensitivity of the sensor by optimizing the sensitive fiber.

What is claimed is:

1. An optic fiber hydrophone comprising:
    a wide spectrum source of a linearly polarized, super-luminescent diode type;
    a first side-hole optic fiber, called a compensation fiber, not subjected to the field of pressure to be detected, followed by a first polarizer with an axis at 45° to the neutral axes of the fiber which are themselves at 45° to the polarization of the source, forming an interferometer;
    a passive sensor, subjected to the field of pressure, comprising a second side-hole optic fiber, having neutral axes reversed with respect to those of the compensation fiber, coupled to the first polarizer and followed by a second polarizer at 45° to the neutral axes of the fiber, forming a second interferometer at the output of which the working differences between the two polarizations, which are not due to the field of pressure, are compensated for;
    a detector;
    and a circuit for processing radiation detected by the detector.

2. An optic fiber hydrophone according to claim 1 wherein, to offset the passive sensor of a carrier on which the source, the detector and the processing circuit are arranged, the hydrophone further comprises a polarization-preserving monomode fiber connecting the output face of the first polarizer to the input face of the second side-hole optic fiber, and a collecting fiber connecting the output face of the second polarizer to the detector.

3. A hydrophone according to either of the claims 1 or 2, wherein an electrically controlled birefringence modulator is placed on the optical path, to modulate interfermetrical responses.

4. A hydrophone antenna associating a series of optic fiber hydrophones, said antenna comprising:
    a wide spectrum source, of a pulse-modulated, super-luminescent type;
    a first side-hole optic fiber, followed by a first polarizer at 45° to the neutral axes of the fiber, forming a compensator;
    an optic fiber on which N shunting couplers are distributed;
    and N passive sensors, subjected to a field of pressure, connected to the N shunting couplers, each comprising a side-hole optic fiber, with neutral axes that are reversed with respect to those of the fiber of the compensator, followed by a polarizer at 45° to the neutral axes of the fiber and by an output monomode fiber;
    a collecting multimode fiber wherein the radiation coming from the sensors is coupled by splices formed between the output monomode fibers of the sensors and the collecting multimode fiber;
    a detector;
    and a circuit for processing radiation detected by the detector, said circuit demultiplexing and demodulating the signals resulting from the passage through the passive sensors.

5. An antenna according to claim 4, wherein the pulse-modulated source is coupled to the compensator by a monomode fiber into which there is inserted an electrically controlled birefringence modulator, to modulate interferometrical responses.

* * * * *